United States Patent
Kangane et al.

(10) Patent No.: US 11,124,100 B1
(45) Date of Patent: Sep. 21, 2021

(54) VEHICLE SEAT ASSEMBLY INCLUDING HEAD RESTRAINT THAT FOLDS AND UNFOLDS WITH SEAT BACK

(71) Applicant: GM GLOBAL TECHNOLOGY OPERATIONS LLC, Detroit, MI (US)

(72) Inventors: Ranjit V. Kangane, Bengaluru (IN); Pramod Lokhande, Bangalore (IN); Anand V. Iyer, Bangalore (IN); Dan Negrut, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/824,892

(22) Filed: Mar. 20, 2020

(51) Int. Cl.
| | | |
|---|---|---|
| B60N 2/847 | (2018.01) | |
| B60N 2/80 | (2018.01) | |
| B60N 2/844 | (2018.01) | |
| B60N 2/879 | (2018.01) | |
| B60N 2/015 | (2006.01) | |
| B60N 2/20 | (2006.01) | |
| B60N 2/874 | (2018.01) | |
| B60N 2/64 | (2006.01) | |

(52) U.S. Cl.
CPC ............ *B60N 2/879* (2018.02); *B60N 2/015* (2013.01); *B60N 2/20* (2013.01); *B60N 2/643* (2013.01); *B60N 2/874* (2018.02)

(58) Field of Classification Search
CPC .......... B60N 2/856; B60N 2/80; B60N 2/806; B60N 2/838
USPC ....................................................... 297/378.1
See application file for complete search history.

(56) References Cited

U.S. PATENT DOCUMENTS

| | | | | |
|---|---|---|---|---|
| 5,681,079 A | * | 10/1997 | Robinson ............. | B60N 2/3013 297/61 |
| 7,344,189 B2 | * | 3/2008 | Reed ...................... | B60N 2/206 297/61 |
| 8,197,007 B2 | * | 6/2012 | Lutzka .................. | B60N 2/844 297/408 |
| 8,449,012 B2 | * | 5/2013 | Seibold ................. | B60N 2/986 296/65.05 |
| 8,662,578 B2 | * | 3/2014 | Szybisty ................. | B60N 2/36 297/61 |
| 9,145,078 B2 | * | 9/2015 | Locke ..................... | B60N 2/832 |
| 9,827,875 B2 | * | 11/2017 | Wang ...................... | B60N 2/806 |
| 10,093,200 B2 | * | 10/2018 | Dry ......................... | B60N 2/225 |
| 10,377,286 B2 | * | 8/2019 | Kapusky ................ | B60N 2/841 |
| 10,427,572 B2 | * | 10/2019 | Jeong ..................... | B60N 2/844 |
| 10,479,225 B2 | * | 11/2019 | Dry ......................... | B60N 2/806 |
| 2003/0098592 A1 | * | 5/2003 | Nygren .................. | B60N 2/305 296/65.09 |
| 2004/0256894 A1 | * | 12/2004 | McManus .............. | B60N 2/203 297/93 |

(Continued)

*Primary Examiner* — Shin H Kim
(74) *Attorney, Agent, or Firm* — Harness, Dickey & Pierce, P.L.C.

(57) ABSTRACT

A seat assembly includes a seat bottom, a seat back, and a head restraint. The seat back is connected to the seat bottom and is configured to pivot relative to the seat bottom between an unfolded position and a folded position. The head restraint is connected to the seat back and is configured to pivot relative to the seat back between an unfolded position and a folded position. The head restraint is configured to automatically pivot from its folded position to its unfolded position when the seat back pivots from its folded position to its unfolded position.

15 Claims, 7 Drawing Sheets

(56) References Cited

U.S. PATENT DOCUMENTS

| | | | |
|---|---|---|---|
| 2007/0132299 A1* | 6/2007 | Fernandez De La Pradilla .......... | B60N 2/856 297/408 |
| 2007/0236067 A1* | 10/2007 | Nathan ................ | B60N 2/0224 297/378.12 |
| 2011/0309650 A1* | 12/2011 | Seibold ................. | B60N 2/309 296/65.01 |
| 2013/0093218 A1* | 4/2013 | Yetukuri ................ | B60N 2/859 297/61 |
| 2014/0333098 A1* | 11/2014 | DeForest ............... | B60N 2/206 297/61 |
| 2017/0028884 A1* | 2/2017 | Kapusky ................ | B60N 2/856 |
| 2017/0057379 A1* | 3/2017 | Wang .................... | B60N 2/002 |
| 2018/0105070 A1* | 4/2018 | Dry ........................ | B60N 3/001 |
| 2018/0105076 A1* | 4/2018 | Dry ........................ | B60N 2/164 |
| 2018/0319303 A1* | 11/2018 | Jeong .................... | B60N 2/874 |
| 2020/0238871 A1* | 7/2020 | Inadome ................ | B60N 2/841 |
| 2021/0009020 A1* | 1/2021 | Jang ...................... | B60N 2/844 |

* cited by examiner

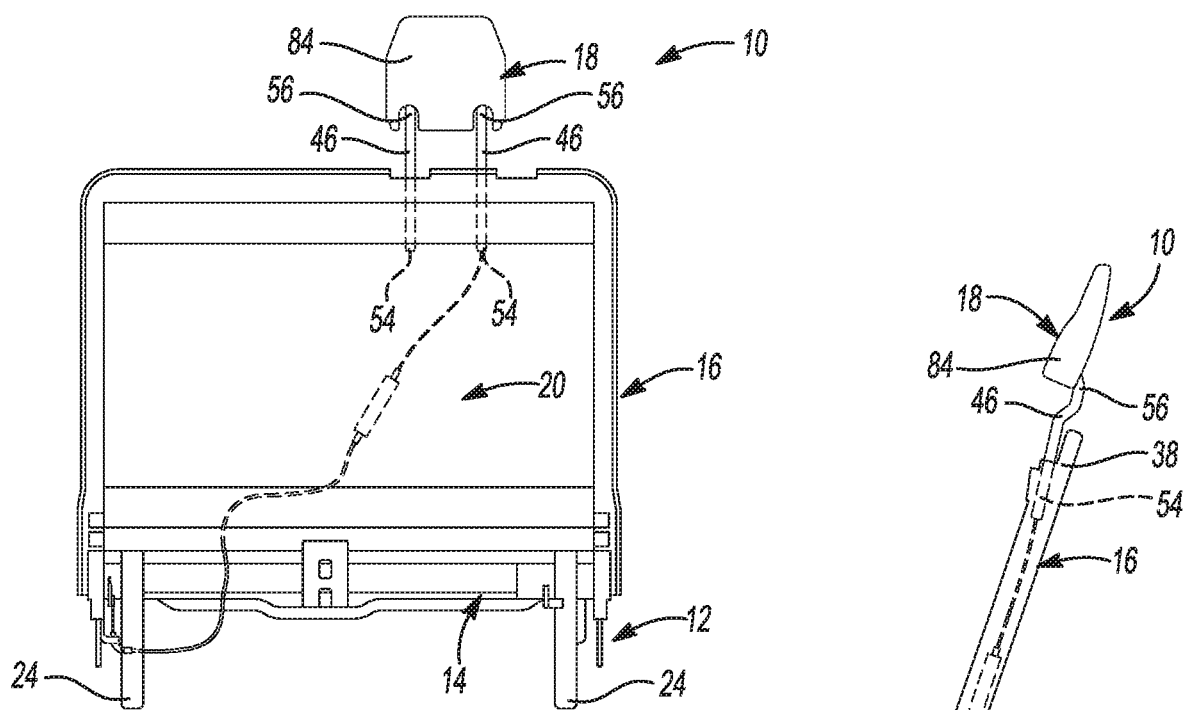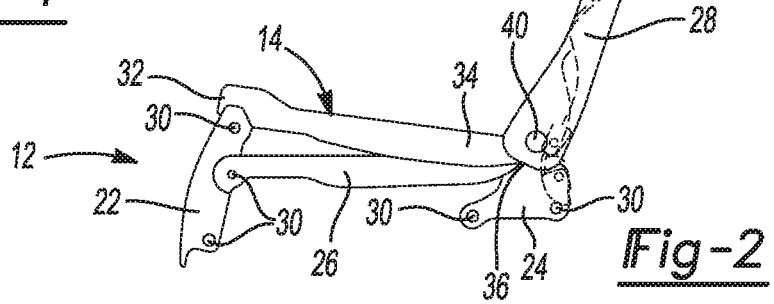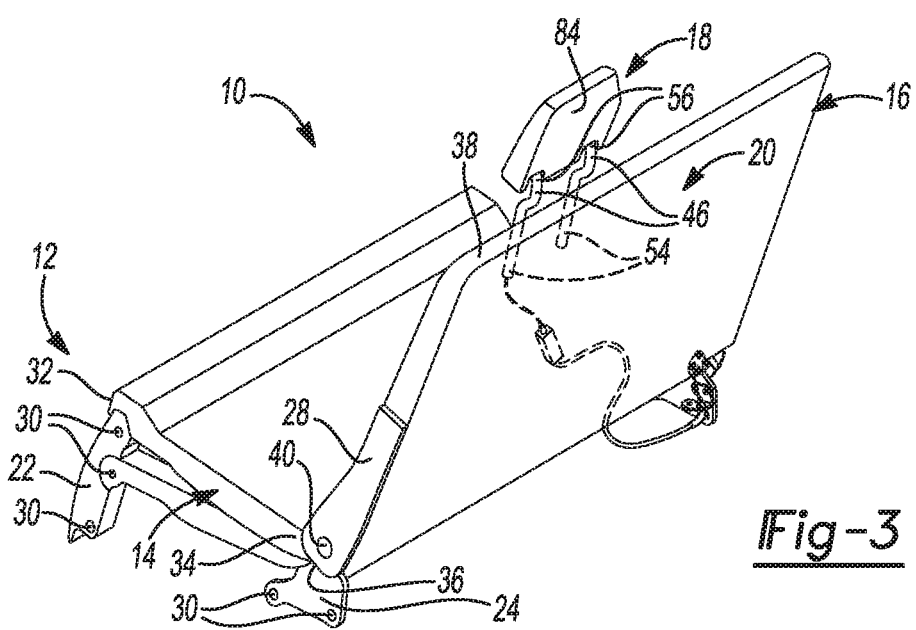

VEHICLE SEAT ASSEMBLY INCLUDING HEAD RESTRAINT THAT FOLDS AND UNFOLDS WITH SEAT BACK

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle seat assembly including a head restraint that folds and unfolds with a seat back.

The vehicle seat assembly typically includes a seat bottom, a seat back, and a head restraint. One end of the seat back is connected to the seat bottom, and the restraint is connected to the seat back. The seat back is pivotable relative to the seat bottom between an unfolded position and a folded (or stowed) position.

In some vehicle seat assemblies such as rear seat assemblies, the head restraint is pivotable relative to the seat back between an unfolded position and a folded position. In some of these vehicle seat assemblies, the head restraint automatically pivots from its unfolded position to its folded position when the seat back pivots from its unfolded position to its folded position. However, when the seat back pivots from its folded position to its unfolded position, the head restraint remains in its folded position.

SUMMARY

One example of a seat assembly according to the present disclosure includes a seat bottom, a seat back, and a head restraint. The seat back is connected to the seat bottom and is configured to pivot relative to the seat bottom between an unfolded position and a folded position. The head restraint is connected to the seat back and is configured to pivot relative to the seat back between an unfolded position and a folded position. The head restraint is configured to automatically pivot from its folded position to its unfolded position when the seat back pivots from its folded position to its unfolded position.

In one example, the head restraint is configured to automatically pivot from its unfolded position to its folded position when the seat back pivots from its unfolded position to its folded position.

In one example, the seat assembly further includes a cable having a first end connected to the seat back and a second end connected to the head restraint. The cable pivots the head restraint from its unfolded position to its folded position when the seat back pivots from its unfolded position to its folded position.

In one example, the seat assembly further includes a seat frame, a mounting bracket, and an outer sheath. The seat frame is configured to be fixed to a floor of a vehicle. The mounting bracket is fixed to the seat frame. The outer sheath is disposed around the cable and is mounted to the mounting bracket in a manner that allows the cable to translate within the outer sheath.

In one example, the seat assembly further includes a first spring captured between the head restraint and the seat back and configured to bias the head restraint toward its unfolded position. The cable allows the first spring to pivot the head restraint from its folded position to its unfolded position when the seat back pivots from its folded position to its unfolded position. The cable prevents the first spring from pivoting the head restraint from its folded position to its unfolded position when the seat back is in its folded position.

In one example, the seat assembly further includes a pair of head restraint rods and a pivot rod. The head restraint rods extend vertically from an upper end of the seat back. Each of the head restraint rods has a lower end connected to the seat back and an upper end opposite of the lower end. The pivot rod extends between the upper ends of the head restraint rods and are fixed thereto. The head restraint is pivotally mounted to the pivot rod.

In one example, the seat assembly further includes a mounting bracket projecting radially from the pivot rod, and an outer sheath disposed around the cable and attached to the mounting bracket in a manner that allows the cable to translate within the outer sheath.

In one example, the seat assembly further includes a pair of end caps and a first spacer rod. Each of the end caps defines a hole through which the pivot rod extends. The first spacer rod extends between the end caps and connects the end caps to one another.

In one example, the seat assembly further includes an annular cam and a lock bracket. The annular cam is mounted on the pivot rod and is fixed to the head restraint. The lock bracket is pivotally mounted on the first spacer rod and defines a slot that captures the second end of the cable. When the cable is tensioned due to the seat back moving from its unfolded position to its folded position, the cable rotates the lock bracket into contact with the annular cam, which causes the head restraint to rotate about the pivot rod in a first direction from its unfolded position to its folded position.

In one example, the seat assembly further includes an annular flange fixed to the pivot rod and defining a groove that extends into a perimeter of the annular flange, and the lock bracket includes a locking pawl that is configured to engage the groove in the annular flange to lock the head restraint in its unfolded position.

In one example, the seat assembly further includes a second spring captured between one of the end caps and the lock bracket and biasing the locking pawl of the locking bracket toward the groove in the annular flange fixed to the pivot rod.

In one example, when the cable is tensioned due to the seat back moving from its unfolded position to its folded position, the cable rotates the lock bracket and thereby disengages the locking pawl from the groove in the annular flange, which allows the head restraint to rotate about the pivot rod.

In one example, when slack is provided in the cable due to the seat back moving from its folded position to its unfolded position, the first spring rotates the head restraint in a second direction opposite of the first direction until the locking pawl reengages the groove in the annular flange.

In one example, the seat assembly further includes a second spacer rod and a stopper. The second spacer rod extends between the end caps and connects the end caps to one another. The second spacer rod is disposed aft of the pivot rod when the head restraint is in its unfolded position. The stopper is mounted to the second spacer rod and is configured to stop rotation of the annular cam in the second direction.

In one example, the seat assembly further includes a third spacer rod extending between upper ends of the end caps and connecting the end caps to one another. The first spacer rod is disposed vertically between the third spacer rod and the pivot rod when the head restraint is in its unfolded position.

Another example of a seat assembly according to the present disclosure includes a seat bottom, a seat back, a head restraint, and a pivot mechanism. The seat back is connected to the seat bottom and is configured to pivot relative to the seat bottom between an unfolded position and a folded position. The head restraint is connected to the seat back and is configured to pivot relative to the seat back between an unfolded position and a folded position. The pivot mechanism is connected to the seat back and the head restraint and is configured to pivot the head restraint from its folded position to its unfolded position when the seat back pivots from its folded position to its unfolded position.

In one example, the pivot mechanism includes a cable having a first end connected to the seat back and a second end connected to the head restraint. When the seat back pivots from its unfolded position to its folded position, the cable rotates the head restraint from its unfolded position to its folded position.

In one example, the pivot mechanism further includes a first spring captured between the head restraint and the seat back and configured to bias the head restraint toward its unfolded position. The cable allows the first spring to pivot the head restraint from its folded position to its unfolded position when the seat back pivots from its folded position to its unfolded position. The cable prevents the first spring from pivoting the head restraint from its folded position to its unfolded position when the seat back is in its folded position.

In one example, the seat back includes a pair of head restraint rods and a pivot rod, the head restraint includes a pair of end caps and a first spacer rod, and the pivot mechanism includes an annular cam and a lock bracket. The head restraint rods extend vertically from an upper end of the seat back. The pivot rod extends between the head restraint rods and is fixed thereto. The head restraint is pivotally mounted to the pivot rod. Each of the end caps defines a hole through which the pivot rod extends. The first spacer rod extends between the end caps and connects the end caps to one another. The annular cam is mounted on the pivot rod and is fixed to the one of the end caps. The lock bracket is pivotally mounted on the first spacer rod and defines a slot that captures the second end of the cable. When the cable is tensioned due to the seat back moving from its unfolded position to its folded position, the cable rotates the lock bracket into contact with the annular cam, which causes the head restraint to rotate about the pivot rod in a first direction from its unfolded position to its folded position.

In one example, when slack is provided in the cable due to the seat back moving from its folded position to its unfolded position, the first spring rotates the head restraint in a second direction from its folded position to its unfolded position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a rear view of an example seat assembly according to the present disclosure, the seat assembly including a seat frame, a seat bottom, a seat back, and a head restraint, with the seat back and the head restraint shown in their respective unfolded positions;

FIG. 2 is a side view of the seat assembly of FIG. 1 with the seat back in the head restraint shown in their respective unfolded positions;

FIG. 3 is a rear perspective view of the seat assembly of FIG. 1 with the seat back and the head restraint shown in their respective unfolded positions;

In the drawings, reference numbers may be reused to identify similar and/or identical elements.

DETAILED DESCRIPTION

Figure 4:
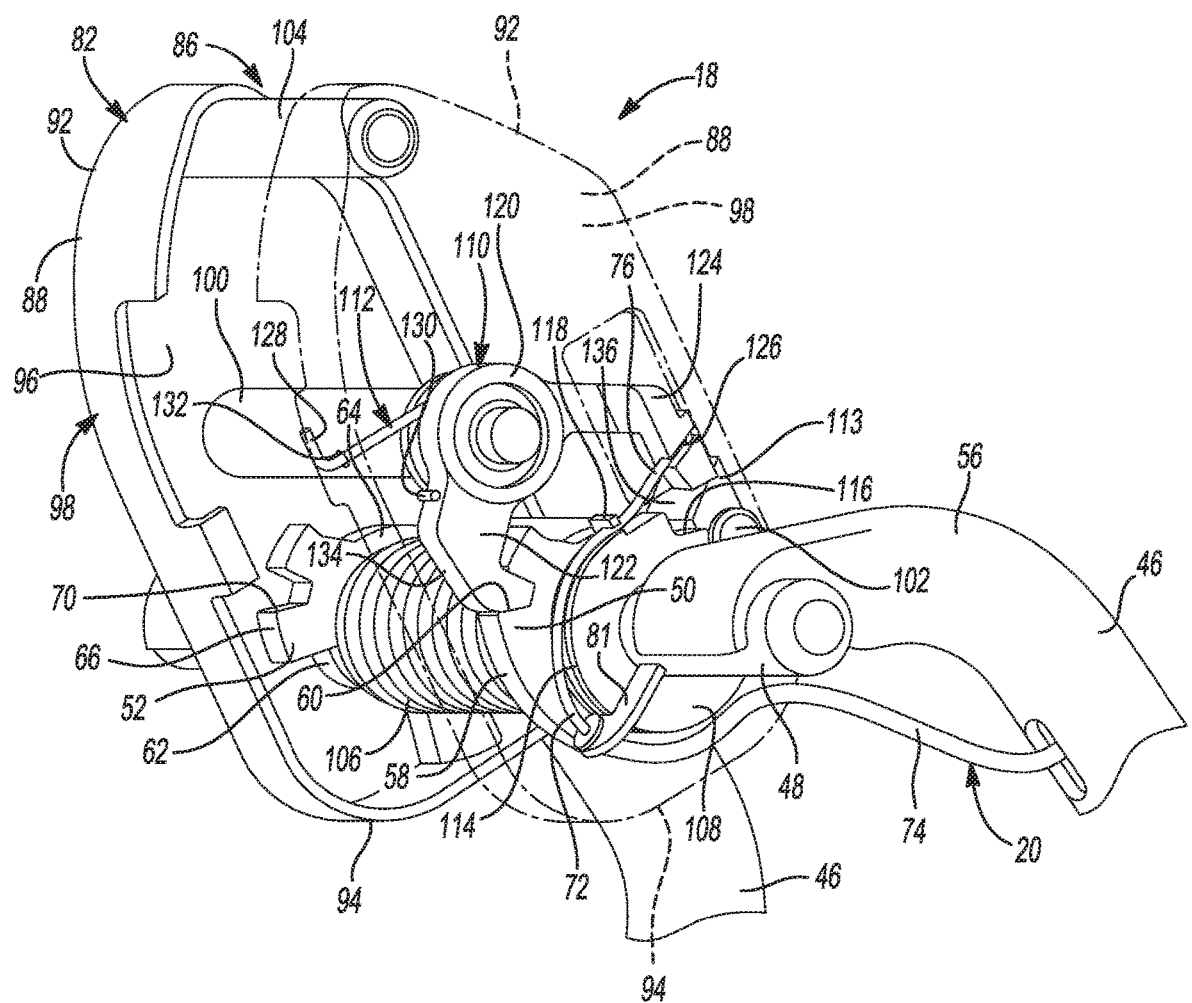
FIG. 4 is a perspective view of the head restraint of FIG. 1 in its unfolded position with an outer cushion of the head restraint removed to illustrate inner components of the head restraint.

A seat assembly according to the present disclosure includes a seat frame, a seat bottom, a seat back, a head restraint, and a pivot mechanism. The seat back is pivotable relative to the seat bottom between an unfolded position and a folded position. The head restraint is pivotable relative to the seat back between an unfolded position and a folded position. The pivot mechanism pivot the head restraint from its unfolded position to its folded position when the seat back pivots from its unfolded position to its folded position. In addition, the pivot mechanism pivots the head restraint from its folded position to its unfolded position when the seat back pivots from its folded position to its unfolded position.

In one example, the pivot mechanism includes a cable that connects the head restraint to the seat back, and a spring that biases the head restraint toward its unfolded position. When the seat back pivots from its unfolded position to its folded position, tension in the cable causes the head restraint to pivot from its unfolded position to its folded position. When the seat back pivots from folded position to its unfolded position, slack in the cable allows the spring to pivot the head restraint from its folded into its unfolded position.

Referring now to FIGS. 1-3, a seat assembly 10 includes a seat frame 12, a seat bottom 14, a seat back 16, a head restraint 18, and a cable assembly 20. The seat frame 12 pivotally connects the seat back 16 to the seat bottom 14. The seat frame 12 is configured to be attached (e.g., fastened) to a vehicle floor. The seat frame 12 includes a pair of front mounting feet 22, a pair of rear mounting feet 24, a pair of horizontal braces 26 extending between the front and rear mounting feet 22 and 24, and a pair of vertical braces 28 extending upward from the rear mounting feet 24. Although FIGS. 1-3 only show one of the front mounting feet 22, one of the horizontal braces 26, and one of the vertical braces 28, the other ones of the front mounting feet 22, the horizontal braces 26, and the vertical braces 28 are identical to those shown and are disposed on the other side of the seat assembly 10.

Each of the front mounting feet 22, the rear mounting feet 24, the horizontal braces 26, and the vertical braces 28 defines holes 30 configured to receive fasteners (not shown). The horizontal braces 26 connect the front and rear mounting feet 22 and 24 to one another on each side of the seat assembly 10. The vertical braces 28 are attached to opposite sides of the seat back 16. The vertical braces 28 may be considered part of the seat back 16 rather than part of the seat frame 12.

The seat bottom 14 has a forward end 32 and a rearward end 34. The front mounting feet 22 are attached to the forward end 32 of the seat bottom 14 using, for example, fasteners that extend through the holes 30 in the front mounting feet 22 and into the seat bottom 14. The rear mounting feet 24 are attached to the rearward end 34 of the seat bottom 14 using, for example, fasteners.

Figure 6:
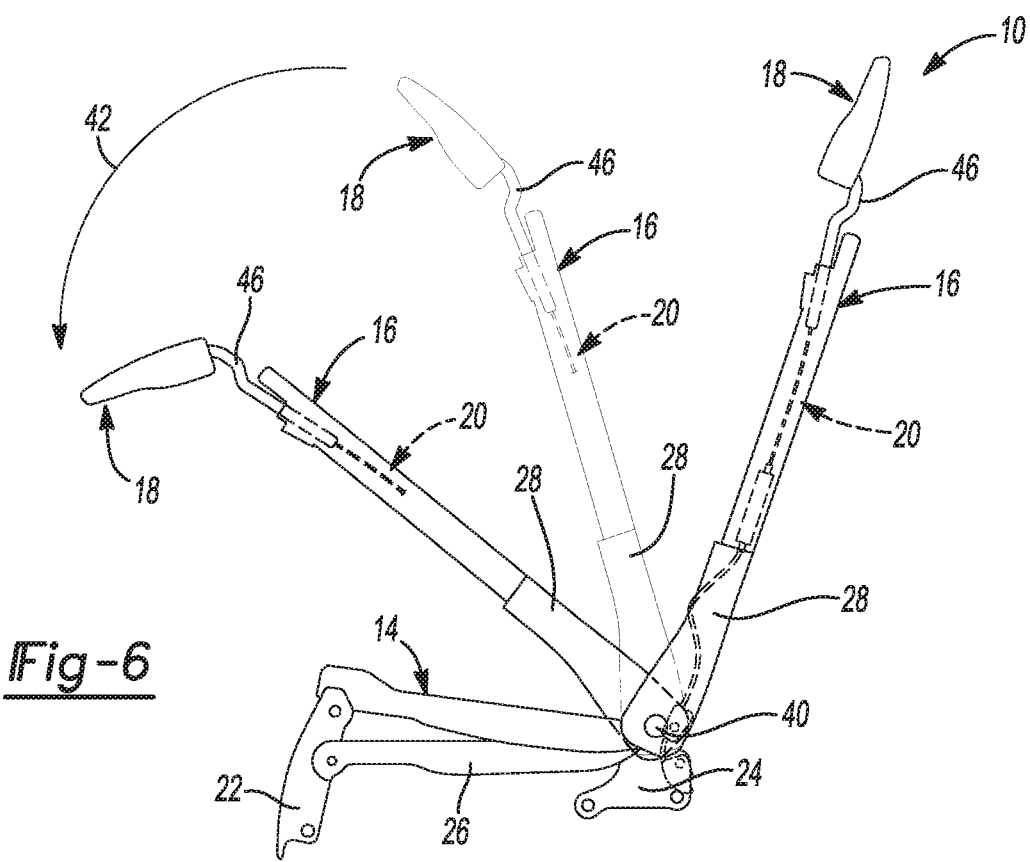
FIG. 6 is a side view of the seat assembly of FIG. 1 illustrating the seat back and the head restraint pivoting from their respective unfolded positions to their respective folded positions.
Figure 13:
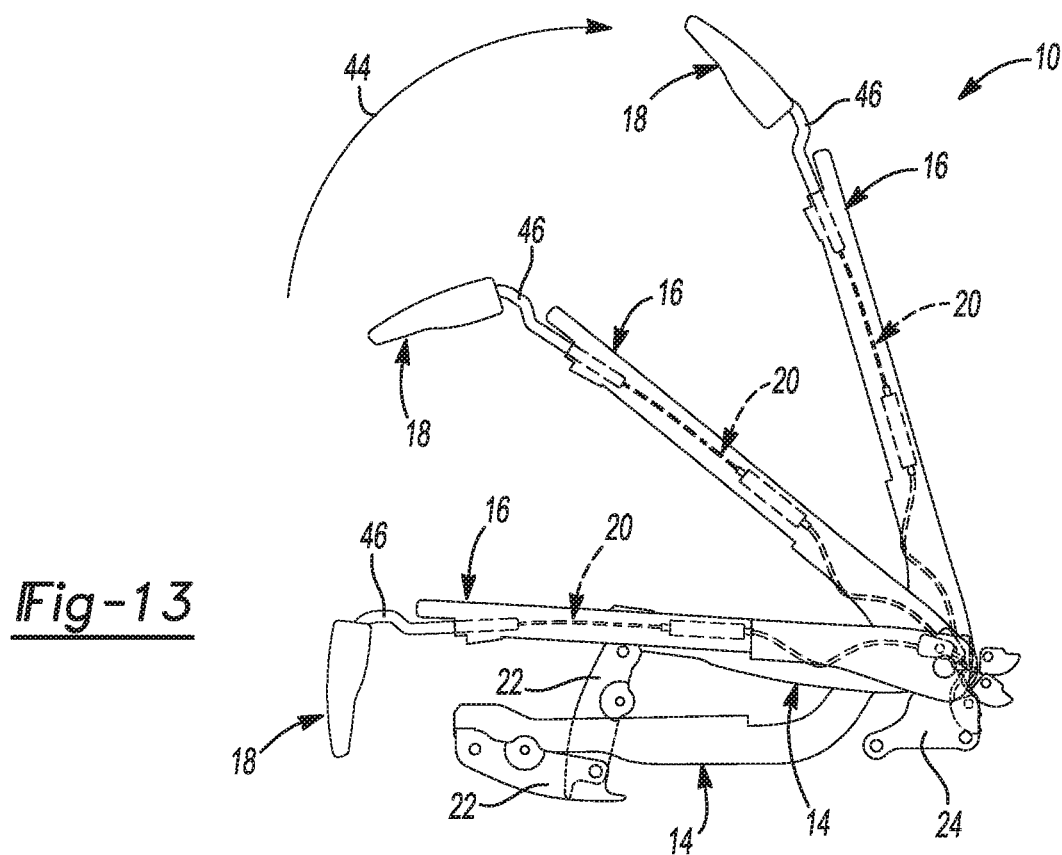
FIG. 13 is a side view of the seat assembly of FIG. 1 illustrating the seat back and the head restraint pivoting from their respective folded positions to their respective unfolded positions.
Figure 14:
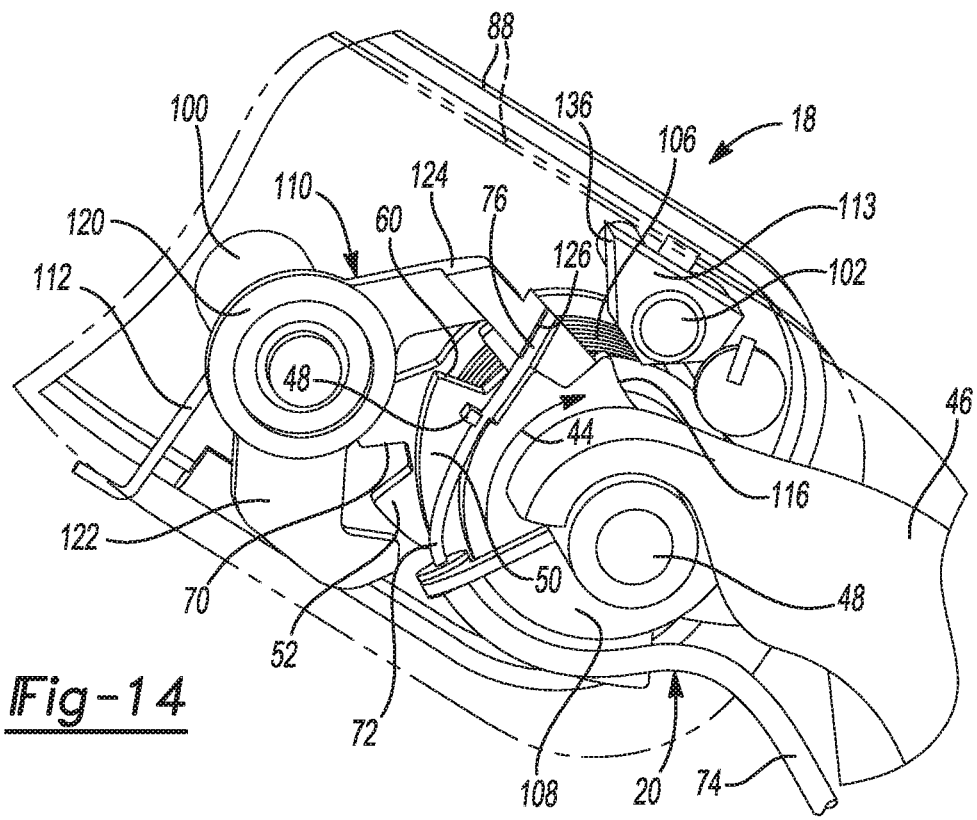
FIG. 14 is a sectioned perspective view of the head restraint of FIG. 1 showing the other end of the inner cable allowing a spring mounted to the seat back to pivot the head restraint from its folded position to its unfolded position.

The seat back 16 has a lower end 36 and an upper end 38. The lower end 36 of the seat back 16 is connected to the rearward end 34 of the seat bottom 14 via a pivot connection 40. With additional reference to FIGS. 6, 9, 11, and 13, the pivot connection 40 enables the seat back 16 to pivot relative to the seat bottom 14 between an unfolded position shown in FIGS. 1-3 and a folded position shown in FIGS. 9 and 11. FIG. 6 shows the seat back 16 pivoting in a first direction 42 from its unfolded position to its folded position. FIG. 13 shows the seat back 16 pivoting in a second direction 44 from its folded position to its unfolded position. The second direction 44 is opposite of the first direction 42. When the seat back 16 pivots from its unfolded position to its folded position, the front mounting feet 22 pivot from their upright positions shown in FIGS. 1-3 to their stowed positions shown in FIGS. 9 and 11. In turn, the seat back 16 lies flat when the seat back 16 is in its folded position.

Figure 9:
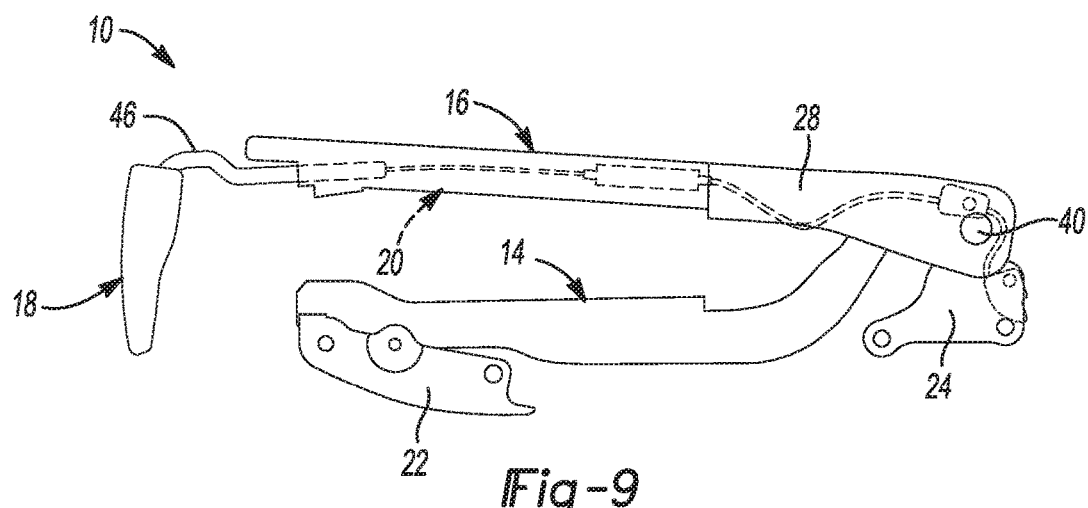
FIG. 9 is a side view of the seat assembly of FIG. 1 with the seat back and the head restraint shown in their respective folded positions.
Figure 11:
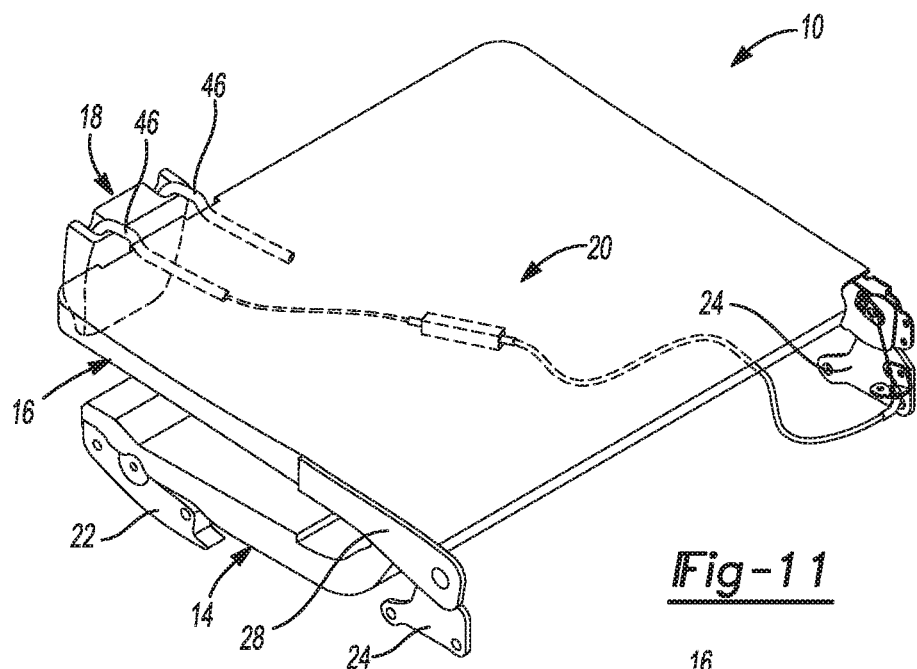
FIG. 11 is a perspective view of the seat assembly of FIG. 1 with the seat back and the head restraint shown in their respective folded positions.
Figure 12:
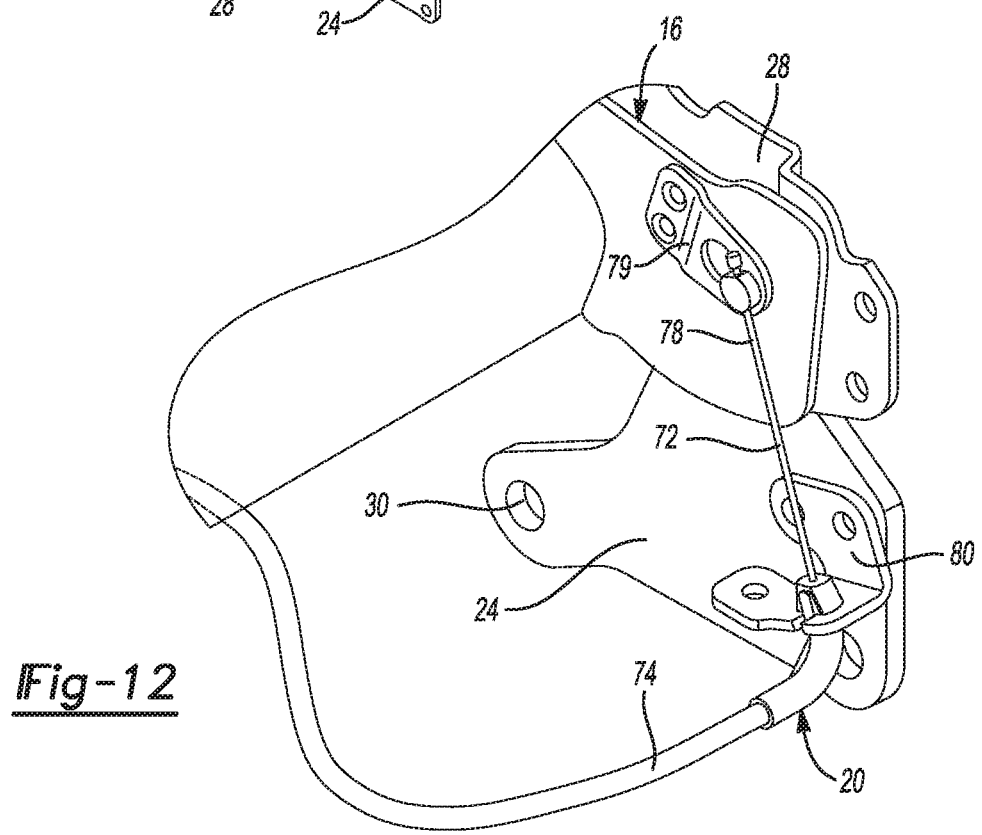
FIG. 12 is a perspective view of a portion of the seat assembly of FIG. 1 illustrating the outer sheath of the cable assembly attached to the seat frame and the one end of the inner cable attached to the seat back, which is shown in its folded position.

The head restraint 18 is configured to pivot between an unfolded position shown in FIGS. 1-3 and a folded position shown in FIGS. 9 and 11. FIG. 6 shows the head restraint 18 pivoting in the first direction 42 from its unfolded position to its folded position. FIG. 13 shows the head restraint 18 pivoting in the second direction 44 from its folded position to its unfolded position. The head restraint 18 automatically pivots from its unfolded position to its folded position when the seat back 16 pivots from its unfolded position to its folded position. In other words, when the seat back 16 pivots from its unfolded position to its folded position, the head restraint 18 pivots from its unfolded position to its folded position without any manual operation such as a user pivoting the head restraint 18 by hand. Conversely, the head restraint 18 automatically pivots from its folded position to its unfolded position when the seat back 16 pivots from its folded position to its unfolded position.

The seat back 16 may be manually pivoted between its unfolded position and its folded position. For example, a user may pivot the seat back 16 by hand between its unfolded position and its folded position. Alternatively, the seat back 16 may be automatically pivoted between its unfolded position and its folded position. For example, an electric motor may be connected to the seat back 16, and the electric motor may rotate the seat back 16 between its unfolded position and its folded position in response to a user pressing a button or a touchscreen. Regardless of whether the seat back 16 is manually or automatically pivoted, the head restraint 18 automatically pivots with the seat back 16 between their respective unfolded and folded positions. However, the automatic pivoting of the head restraint 18 does not involve an actuator such as an electric motor. Rather, the head restraint 18 is mechanically coupled to the seat back 16 in a manner that causes the head restraint 18 to pivot with the seat back 16 between their respective unfolded and folded positions.

Referring now to FIGS. 1-4, the head restraint 18 is mounted to the seat back 16 using a pair of head restraint rods 46, a pivot rod 48, a first annular flange 50, and a second annular flange 52. The head restraint rods 46, the pivot rod 48, and the first and second annular flange is 50 and 52 may be considered part of the seat back 16. The head restraint rods 46 project upward from the upper end 38 of the seat back 16.

Each head restraint rod 46 has a lower end 54 and an upper end 56. The lower ends 54 of the head restraint rods 46 are fixed (e.g., welded) to the seat back 16. The head restraint 18 is pivotally mounted to the pivot rod 48, which extends between the upper ends 56 of the head restraint rods 46 and is fixed (e.g., welded) to the upper ends 56.

Figure 10:
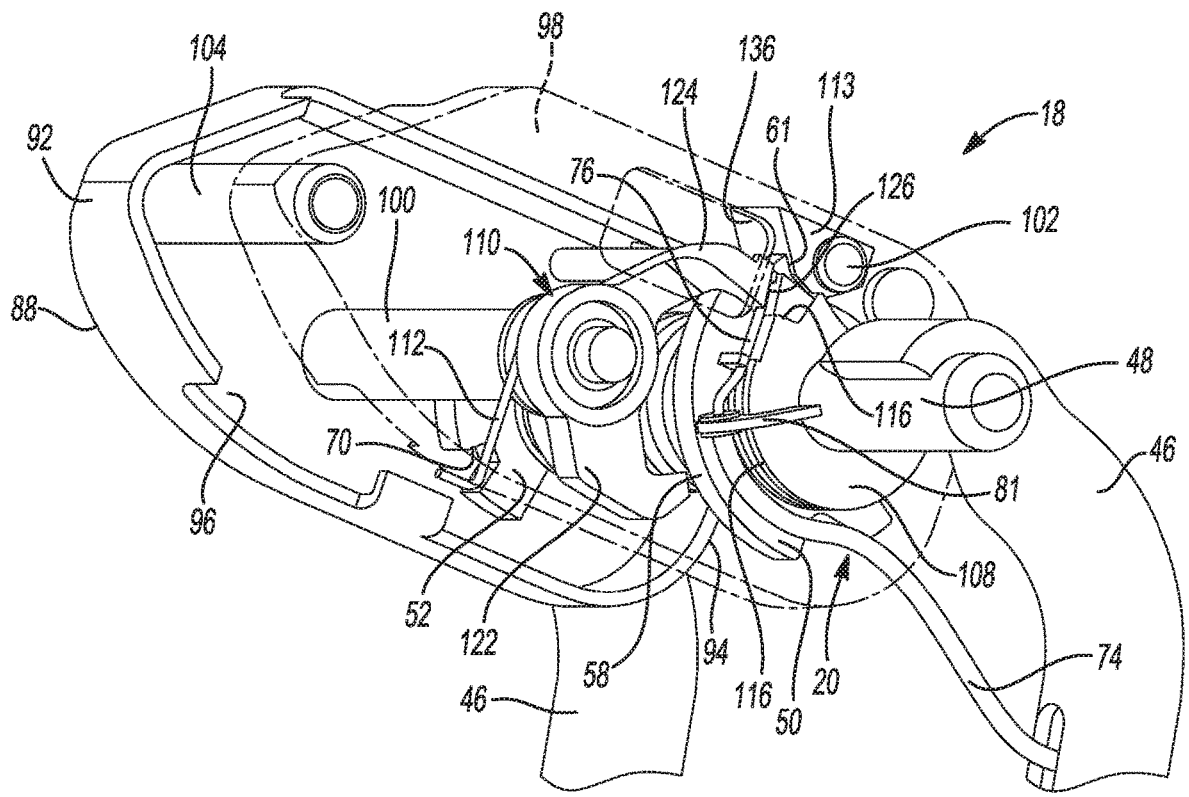
FIG. 10 is a perspective view of the head restraint of FIG. 1 with the head restraint shown in its folded position.

Each of the first and second annular flanges 50 and 52 are fixed (e.g., welded) to the pivot rod 48 and project radially therefrom. The first annular flange 50 has a perimeter surface 58 defining a groove 60 and a shoulder 61 (FIG. 10). The second annular flange 52 has a perimeter surface 62 and includes an annular body 64, a first projection 66 that protrudes radially outward from the annular body 64, and a second projection 68 that protrudes radially outward from the annular body 64. The first projection 66 defines a groove 70 that extends into the perimeter surface 62. The shape of the groove 70 is similar or identical to the shape of the groove 60.

Figure 5:
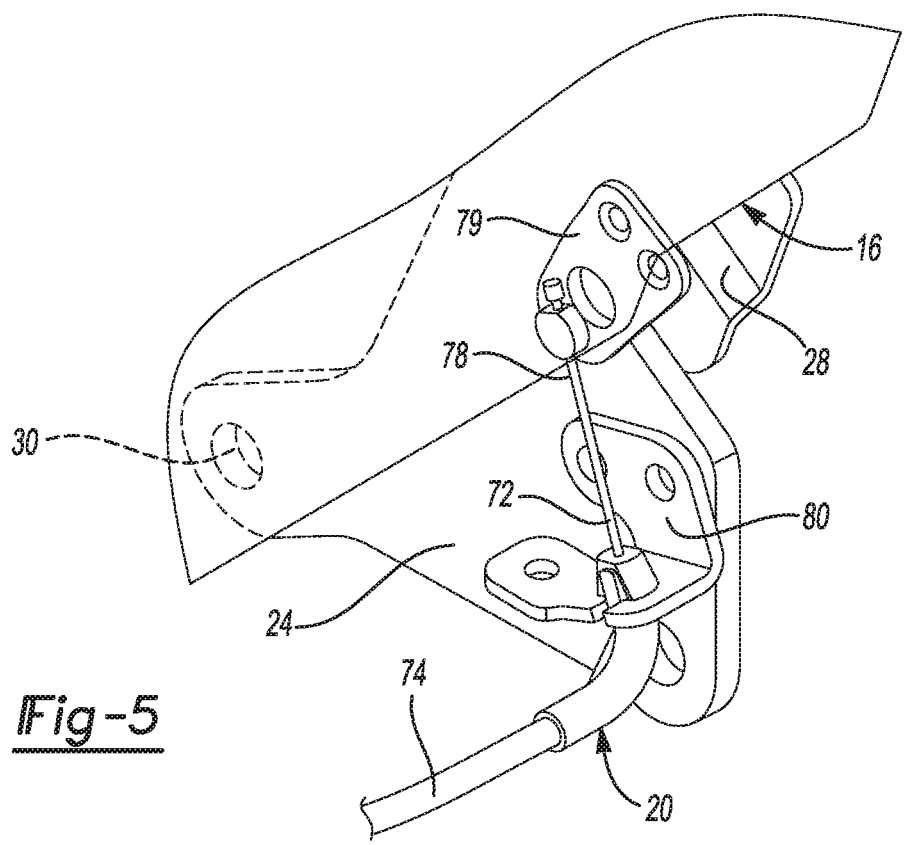
FIG. 5 is a perspective view of a portion of the seat assembly of FIG. 1 including a cable assembly having an inner cable and an outer sheath, where the outer sheath is mounted to the seat frame, and one end of the inner cable is attached to the seat back, which is shown in its unfolded position.

The cable assembly 20 may be routed through the seat back 16 and one of the head restraint rods 46 as shown in FIGS. 1-4. Referring now to FIGS. 4 and 5, the cable assembly 20 includes an inner cable 72 and an outer sheath 74. The inner cable 72 has a first end 76 and a second end 78 opposite of the first end 76. The first end 76 of the inner cable 72 is secured to the seat back 16 using a mounting bracket 79, and the second end 78 of the inner cable 72 is connected to the head restraint 18. Thus, when the seat back 16 pivots from its unfolded position to its folded position, the inner cable 72 rotates the head restraint 18 from its unfolded position to its folded position.

With continued reference to FIGS. 4 and 5, the outer sheath 74 surrounds the inner cable 72 along a majority of the length of the inner cable 72. Adjacent to the second end 78 of the inner cable 72, the outer sheath 74 is mounted to one of the rear mounting feet 24 using a mounting bracket 80. The mounting bracket 80 secures the outer sheath 74 to the one mounting foot 24 while allowing the inner cable 72 to translate relative to the outer sheath 74. Adjacent to the first end 76 of the inner cable 72, the outer sheath 74 is mounted to the pivot rod 48 using a mounting bracket 81 that projects radially from the pivot rod 48. The mounting bracket 81 secures the outer sheath 74 to the pivot rod 48 while allowing the inner cable 72 to translate relative to the outer sheath 74.

The head restraint 18 includes an inner frame 82, an outer cushion 84 (FIGS. 1-3) enclosing the inner frame 82, and a pivot mechanism 86 that pivots the inner frame 82 and the outer cushion 84 between the unfolded and folded positions of the head restraint 18. While the outer cushion 84 is shown in FIGS. 1-3, the outer cushion 84 is omitted in FIG. 4 to illustrate components disposed within the outer cushion 84 such as the inner frame 82 and the pivot mechanism 86. The outer cushion 84 may include an inner cushion and an outer liner enclosing the inner cushion. The inner cushion may be made of a cushion material such as foam, and the outer liner may be made of a vehicle interior finish material such leather or cloth.

The inner frame 82 includes a pair of end caps 88 pivotally mounted on the pivot rod 48, and plurality of spacer rods 90 extending between the end caps 88 and connecting the end caps 88 to one another. One of the end caps 88 is shown in phantom to illustrate components disposed between the end caps 88. Each end cap 88 has an upper end 92, a lower end 94, an inner surface 96, and an outer surface 98.

The spacer rods 90 include a first spacer rod 100, a second spacer rod 102, and a third spacer rod 104. The first spacer rod 100 is disposed vertically between the third spacer rod 104 and the pivot rod 48 when the head restraint 18 is in its unfolded position as shown in FIG. 4. The second spacer rod 102 is disposed aft of the pivot rod 48 when the head restraint 18 is in its unfolded position.

The pivot mechanism 86 pivots the head restraint 18 from its unfolded position to its folded position when the seat back 16 pivots from its unfolded position to its folded position. Conversely, the pivot mechanism 86 pivots the head restraint 18 from its folded position to its unfolded position when the seat back 16 pivots from its folded position to its unfolded position. The pivot mechanism 86 may be considered part of the head restraint 18 as described above, in which case the pivot mechanism 86 pivots the rest of the head restraint 18 between the unfolded and folded positions of the head restraint 18. Alternatively, the pivot mechanism 86 may be considered separate from the head restraint 18, in which case the pivot mechanism 66 pivots the entire head restraint 18 between its unfolded and folded positions. Additionally, the cable assembly 20 may be considered part of the pivot mechanism 66.

The pivot mechanism 66 includes a first spring 106, an annular cam 108, a lock bracket 110, a second spring 112, and a stopper 113. The first spring 106 is captured between the head restraint 18 and the seat back 16 and biases the head restraint 18 toward its unfolded position shown in FIG. 4. The inner cable 72 allows the first spring 106 to pivot the head restraint 18 from its folded position (FIG. 10) to its unfolded position (FIG. 4) when the seat back 16 pivots from its folded position to its unfolded position as shown in FIG. 13. The inner cable 72 prevents the first spring 106 from pivoting the head restraint 18 from its folded position to its unfolded position when the seat back 16 is in its folded position as shown in FIGS. 8-12.

With continued reference to FIGS. 4 and 5, the annular cam 108 is mounted on the pivot rod 48 and fixed (e.g., welded) to the outer surface 98 of one of the end caps 88. The annular cam 108 has a perimeter surface 114 that defines a shoulder 116. The annular cam 108 includes a retaining clip 118 that projects from the perimeter surface 114 and retains the inner cable 72 adjacent to the perimeter surface 114.

The lock bracket 110 is pivotally mounted on the first spacer rod 100. The lock bracket 110 includes an annular body 120, a locking pawl 122 projecting radially outward from the annular body 120 in one direction, and a retention arm 124 projecting radially outward from the annular body 120 in another direction. The retention arm 124 defines a slot 126 that captures the second end 78 of the inner cable 72.

Figure 7:
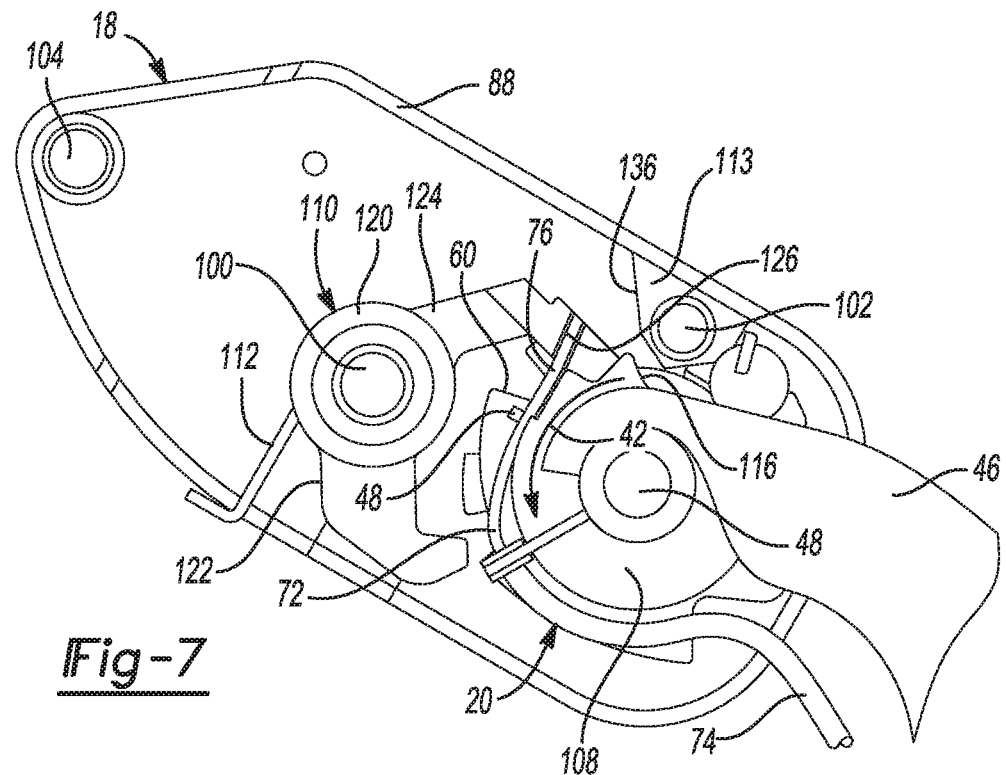
FIG. 7 is a sectioned side view of the head restraint of FIG. 1 showing the other end of the inner cable attached to the head restraint and pivoting the head restraint from its unfolded position to its folded position.
Figure 8:
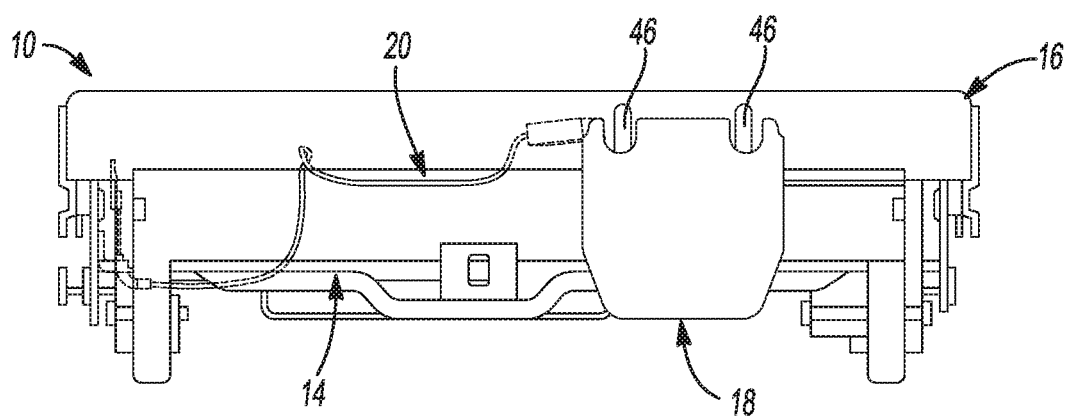
FIG. 8 is a front view of the seat assembly of FIG. 1 with the seat back and the head restraint shown in their respective folded positions.

The locking pawl 122 engages the groove 60 in the annular flange 50 to lock the head restraint 18 in its unfolded position when the seat back 16 is in its unfolded position as shown in FIGS. 1-3. When the inner cable 72 is tensioned due to the seat back 16 moving from its unfolded position to its folded position as shown in FIG. 6, the inner cable 72 rotates the retention arm 124 of the lock bracket 110 into contact with the shoulder 116 on the annular cam 108 as shown in FIG. 7. This contact causes the head restraint 18 to rotate about the pivot rod 48 in the first direction 42 from its unfolded position shown in FIG. 4 to its folded position shown in FIG. 10. When slack is provided in the inner cable 72 due to the seat back 16 moving in the second direction 44 from its folded position to its unfolded position as shown in FIG. 13, the first spring 106 rotates the head restraint 18 in the second direction 44 until the locking pawl 122 reengages the groove 60 in the annular flange 50 as shown in FIG. 4. Although the inner cable 72 appears to have slack in FIGS. 8-12, it should be understood that the inner cable 72 may completely taut when the seat back 16 and the restraint 18 are in their respective folded positions.

Referring again to FIGS. 4 and 5, the second spring 112 is captured between one of the end caps 88 and the lock bracket 110. The second spring 112 has a first end 128 and a second end 130 opposite of the first end 128. The first end 128 of the second spring 112 extends through a hole 132 in the one end cap 88 and includes an upward bend 132 that prevents the first end 128 from backing out of the hole 132. The second end 130 of the second spring 120 presses against a perimeter surface 134 of the locking pawl 122, and thereby biases the locking pawl 122 toward the groove 60 in the annular flange 50.

The stopper 113 is mounted on the second spacer rod 102. The stopper 113 has a ramped surface 136. The ramped surface 136 of the stopper 113 engages the shoulder 61 on the annular flange 50, and thereby stops rotation of the annular cam in the first direction 42 (FIG. 6), when the head restraint 18 is in its folded position as shown in FIG. 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element or layer is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A seat assembly comprising:
    a seat bottom;
    a seat back connected to the seat bottom and configured to pivot relative to the seat bottom between an unfolded position and a folded position;
    a head restraint connected to the seat back and configured to pivot relative to the seat back between an unfolded position and a folded position, wherein the head restraint is configured to automatically pivot from its folded position to its unfolded position when the seat back pivots from its folded position to its unfolded position, and the head restraint is configured to automatically pivot from its unfolded position to its folded position when the seat back pivots from its unfolded position to its folded position;
    a cable having a first end connected to the seat back and a second end connected to the head restraint, wherein the cable pivots the head restraint from its unfolded position to its folded position when the seat back pivots from its unfolded position to its folded position; and
    a first spring captured between the head restraint and the seat back and configured to bias the head restraint toward its unfolded position, wherein the cable allows the first spring to pivot the head restraint from its folded position to its unfolded position when the seat back pivots from its folded position to its unfolded position, and the cable prevents the first spring from pivoting the head restraint from its folded position to its unfolded position when the seat back is in its folded position.

2. The seat assembly of claim 1 further comprising:
    a seat frame configured to be fixed to a floor of a vehicle;
    a mounting bracket fixed to the seat frame; and
    an outer sheath disposed around the cable and mounted to the mounting bracket in a manner that allows the cable to translate within the outer sheath.

3. The seat assembly of claim 1 further comprising:
    a pair of head restraint rods that extend vertically from an upper end of the seat back, each of the head restraint rods having a lower end connected to the seat back and an upper end opposite of the lower end; and
    a pivot rod extending between the upper ends of the head restraint rods and fixed thereto, wherein the head restraint is pivotally mounted to the pivot rod.

4. The seat assembly of claim 3 further comprising:
    a mounting bracket projecting radially from the pivot rod; and
    an outer sheath disposed around the cable and attached to the mounting bracket in a manner that allows the cable to translate within the outer sheath.

5. The seat assembly of claim 3 wherein the head restraint includes:
    a pair of end caps, each of the end caps defining a hole through which the pivot rod extends; and
    a first spacer rod extending between the end caps and connecting the end caps to one another.

6. The seat assembly of claim 5 further comprising:
    an annular cam mounted on the pivot rod and fixed to the head restraint; and
    a lock bracket pivotally mounted on the first spacer rod and defining a slot that captures the second end of the cable, wherein when the cable is tensioned due to the seat back moving from its unfolded position to its folded position, the cable rotates the lock bracket into contact with the annular cam, which causes the head restraint to rotate about the pivot rod in a first direction from its unfolded position to its folded position.

7. The seat assembly of claim 6 further comprising an annular flange fixed to the pivot rod and defining a groove that extends into a perimeter of the annular flange, wherein the lock bracket includes a locking pawl that is configured to engage the groove in the annular flange to lock the head restraint in its unfolded position.

8. The seat assembly of claim 7 further comprising a second spring captured between one of the end caps and the lock bracket and biasing the locking pawl of the locking bracket toward the groove in the annular flange fixed to the pivot rod.

9. The seat assembly of claim 7 wherein when the cable is tensioned due to the seat back moving from its unfolded position to its folded position, the cable rotates the lock bracket and thereby disengages the locking pawl from the groove in the annular flange, which allows the head restraint to rotate about the pivot rod.

10. The seat assembly of claim 9 wherein when slack is provided in the cable due to the seat back moving from its folded position to its unfolded position, the first spring rotates the head restraint in a second direction opposite of the first direction until the locking pawl reengages the groove in the annular flange.

11. The seat assembly of claim 10 further comprising:
a second spacer rod extending between the end caps and connecting the end caps to one another, wherein the second spacer rod is disposed aft of the pivot rod when the head restraint is in its unfolded position; and
a stopper mounted to the second spacer rod and configured to stop rotation of the annular cam in the second direction.

12. The seat assembly of claim 11 further comprising a third spacer rod extending between upper ends of the end caps and connecting the end caps to one another, wherein the first spacer rod is disposed vertically between the third spacer rod and the pivot rod when the head restraint is in its unfolded position.

13. A seat assembly comprising:
a seat bottom;
a seat back connected to the seat bottom and configured to pivot relative to the seat bottom between an unfolded position and a folded position;
a head restraint connected to the seat back and configured to pivot relative to the seat back between an unfolded position and a folded position; and
a pivot mechanism connected to the seat back and the head restraint and configured to pivot the head restraint from its folded position to its unfolded position when the seat back pivots from its folded position to its unfolded position, wherein:
the pivot mechanism includes a cable having a first end connected to the seat back and a second end connected to the head restraint;
when the seat back pivots from its unfolded position to its folded position, the cable rotates the head restraint from its unfolded position to its folded position;
the pivot mechanism further includes a first spring captured between the head restraint and the seat back and configured to bias the head restraint toward its unfolded position;
the cable allows the first spring to pivot the head restraint from its folded position to its unfolded position when the seat back pivots from its folded position to its unfolded position; and
the cable prevents the first spring from pivoting the head restraint from its folded position to its unfolded position when the seat back is in its folded position.

14. The seat assembly of claim 13 wherein:
the seat back includes a pair of head restraint rods and a pivot rod, the head restraint rods extending vertically from an upper end of the seat back, the pivot rod extending between the head restraint rods and fixed thereto, wherein the head restraint is pivotally mounted to the pivot rod;
the head restraint includes a pair of end caps and a first spacer rod, each of the end caps defining a hole through which the pivot rod extends, the first spacer rod extending between the end caps and connecting the end caps to one another; and
the pivot mechanism includes an annular cam and a lock bracket, the annular cam being mounted on the pivot rod and fixed to the one of the end caps, the lock bracket pivotally mounted on the first spacer rod and defining a slot that captures the second end of the cable, wherein when the cable is tensioned due to the seat back moving from its unfolded position to its folded position, the cable rotates the lock bracket into contact with the annular cam, which causes the head restraint to rotate about the pivot rod in a first direction from its unfolded position to its folded position.

15. The seat assembly of claim 14 wherein when slack is provided in the cable due to the seat back moving from its folded position to its unfolded position, the first spring rotates the head restraint in a second direction from its folded position to its unfolded position.

* * * * *